United States Patent
Woland et al.

(10) Patent No.: US 10,795,998 B2
(45) Date of Patent: Oct. 6, 2020

(54) DYNAMIC ROUTING OF FILES TO A MALWARE ANALYSIS SYSTEM

(71) Applicant: Cisco Technology, Inc., San Jose, CA (US)

(72) Inventors: Aaron T. Woland, Waxhaw, NC (US); Vivek Santuka, Morrisville, NC (US); Moses Hernandez, Boca Raton, FL (US); Steven H. Chimes, Pittsburgh, PA (US); Andrew E. Ossipov, Lewisville, TX (US)

(73) Assignee: Cisco Technology, Inc., San Jose, CA (US)

(*) Notice: Subject to any disclaimer, the term of this patent is extended or adjusted under 35 U.S.C. 154(b) by 126 days.

(21) Appl. No.: 15/910,458

(22) Filed: Mar. 2, 2018

(65) Prior Publication Data

US 2019/0272376 A1 Sep. 5, 2019

(51) Int. Cl.
*G06F 21/56* (2013.01)
*H04L 29/06* (2006.01)

(52) U.S. Cl.
CPC .......... *G06F 21/566* (2013.01); *G06F 21/561* (2013.01); *G06F 21/567* (2013.01); *H04L 63/1416* (2013.01); *G06F 21/56* (2013.01)

(58) Field of Classification Search
CPC .................. G06F 21/566; G06F 21/56; G06F 21/50–577; H04L 63/14; H04L 63/1416; H04L 63/08
See application file for complete search history.

(56) References Cited

U.S. PATENT DOCUMENTS

| | | | |
|---|---|---|---|
| 7,137,145 B2 | 11/2006 | Gleichauf | |
| 8,239,923 B2 | 8/2012 | Krishnan et al. | |
| 8,381,298 B2 | 2/2013 | Blumfield et al. | |
| 8,863,284 B1* | 10/2014 | Polyakov | H04L 63/145 |
| | | | 726/22 |
| 9,183,121 B2 | 11/2015 | Pruss et al. | |
| 9,245,120 B2 | 1/2016 | Friedrichs et al. | |
| 9,338,137 B1* | 5/2016 | Fedko | H04L 63/04 |
| 9,477,837 B1 | 10/2016 | Langton et al. | |
| 9,729,565 B2 | 8/2017 | Reddy et al. | |
| 9,747,445 B2 | 8/2017 | Friedriches et al. | |
| 9,781,037 B2 | 10/2017 | Nellikar et al. | |
| 9,838,294 B2 | 12/2017 | Pruss et al. | |
| 9,876,814 B2 | 1/2018 | McKinney | |
| 10,135,861 B2* | 11/2018 | Harris | H04L 63/145 |
| 10,341,355 B1* | 7/2019 | Niemoller | H04L 63/104 |
| 2012/0079596 A1 | 3/2012 | Thomas et al. | |

(Continued)

*Primary Examiner* — Kristine L Kincaid
*Assistant Examiner* — Shaqueal D Wade
(74) *Attorney, Agent, or Firm* — Edell, Shapiro & Finnan, LLC

(57) ABSTRACT

A method for selecting either a first malware analysis system or a second malware analysis system to analyze a file is disclosed. The method includes obtaining, at a network security element, a file sent between a first device and a second device, the file having one or more associated attributes; analyzing, at the network security element, the one or more attributes of the file; selecting, based on the analyzing, either the first malware analysis system or the second malware analysis system as a selected malware analysis system for malware analysis of the file; and providing the file to the selected malware analysis system.

20 Claims, 7 Drawing Sheets

(56) References Cited

U.S. PATENT DOCUMENTS

| | | | |
|---|---|---|---|
| 2012/0174227 A1* | 7/2012 | Mashevsky | G06F 21/562 |
| | | | 726/24 |
| 2014/0047544 A1 | 2/2014 | Jakobsson | |
| 2014/0047551 A1* | 2/2014 | Nagasundaram | G06F 21/606 |
| | | | 726/26 |
| 2015/0188949 A1 | 7/2015 | Mahaffey et al. | |
| 2015/0261955 A1 | 9/2015 | Huang et al. | |
| 2016/0292420 A1 | 10/2016 | Langton et al. | |
| 2016/0359695 A1 | 12/2016 | Yadav et al. | |
| 2016/0359886 A1 | 12/2016 | Yadav et al. | |
| 2016/0359887 A1 | 12/2016 | Yadav et al. | |
| 2018/0288077 A1* | 10/2018 | Siddiqui | H04L 63/1416 |

* cited by examiner

| DESTINATION IP ~302 | PUBLIC/ PRIVATE ~228 | MALWARE ANALYSIS SYSTEM OS ~232 | COUNTRY ~304 | COST METRIC ~236 | LAST USED ~306 | REMAINING CAPACITY ~308 | CAPACITY RESET TIME ~310 | USAGE RATE ~312 | EFFICACY ~314 |
|---|---|---|---|---|---|---|---|---|---|
| 192.168.1.10 | PRIVATE | WINDOWS 7, 8, 10, OSX | USA | 20 | JULY 31, 10:01:01 | UNLIMITED | JULY 31, 12:00:00 | 10 SAMPLES /HOUR | 90% |
| 192.0.2.100 | PUBLIC | RHEL, WINDOWS 10, UBUNTU | USA | 5 | JULY 31, 10:02:02 | 53 | JULY 31, 12:00:00 | 2 SAMPLES /HOUR | 95% |
| 198.51.100.100 | PUBLIC | WINDOWS 7, WINDOWS 10 | CHINA | 7 | JULY 31, 10:03:03 | 1200 | AUGUST 1, 00:00:00 | 36 SAMPLES /HOUR | 80% |
| 203.0.113.100 | PUBLIC | WINDOWS 7, WINDOWS 10, OSX | USA | 5 | JULY 31, 10:04:04 | 20 | JULY 31, 00:00:00 | 1 SAMPLE /HOUR | 97% |

FIG.3

DYNAMIC ROUTING OF FILES TO A MALWARE ANALYSIS SYSTEM

TECHNICAL FIELD

The present disclosure relates to malware analysis.

BACKGROUND

Organizations may use malware analysis systems to determine whether a file poses a security risk without exposing the organization's network to the security risk. A malware analysis system may analyze, by running or executing, a file to determine the security risk posed by the file. Generally, malware analysis systems provide two mutually exclusive options. The first option is to use a cloud-based, or off-premise, service. Such an option may be attractive to an organization due to the elastic computing power offered by cloud-based services. The second option may be local, or on-premise, services. Such an option may be attractive to an organization due to increased privacy.

BRIEF DESCRIPTION OF THE DRAWINGS

FIG. 3 is a routing table with example attributes and attribute values used for malware analysis system selection, according to an example embodiment.

DESCRIPTION OF EXAMPLE EMBODIMENTS

Overview

Briefly, this disclosure is directed to selecting a malware analysis system from a plurality of malware analysis systems for analyzing a file based on attributes of a connection session, the file, and the malware analysis systems. A network security element obtains a file to be received at a first device within the organization network or a file to be sent from the first device within the organization network. This file may have one or more attributes associated with it. The network security element may analyze the attributes of the file, client device, or user, for example, to determine a security risk posed by the file. The network security element may then select one malware analysis system from the plurality of malware analysis systems to which to send the file for analysis. The network security element then provides the file to the selected malware analysis system.

Example Embodiments

The present disclosure relates to selecting a malware analysis system from a plurality of malware analysis systems to analyze a file for a malware infection. As an example, a first malware analysis system of the plurality of malware analysis systems may be an off-premise malware analysis system and a second malware analysis system of the plurality of malware analysis systems may be an on-premise malware analysis system. This is not meant to be limiting. For example, the plurality of malware analysis systems may all be located on-premise, may all be located off-premises, or at least one may be located on-premise while at least another one may be located off-premise. Additionally, while a file sent between a client and a server are described herein, it should be appreciated that the file may be sent between any two devices. Thus, the techniques of this disclosure are equally applicable to connections other than server-client connections, such as peer-to-peer (P2P) connections.

The "term" file as used herein is meant to include executable code of different types, such as code in memory or a multi-file package, and can be more generally referred to as a "sample." Thus, a "file" may be the unit for analysis, but it is envisioned, that a memory region may be transplanted and executed in a malware analysis system or analyzed by a neural network. Moreover, a period of time or portion of network traffic may be extracted for analysis. Further still, instead of analyzing individual files, an entire software "container" would be analyzed. A container image is a stand-alone, executable package of a piece of software that includes everything needed to run it: code, runtime, system tools, system libraries, settings, as a prepackaged environment. All of these items would be packaged as a file for transport to the selected malware analysis system.

Figure 1:
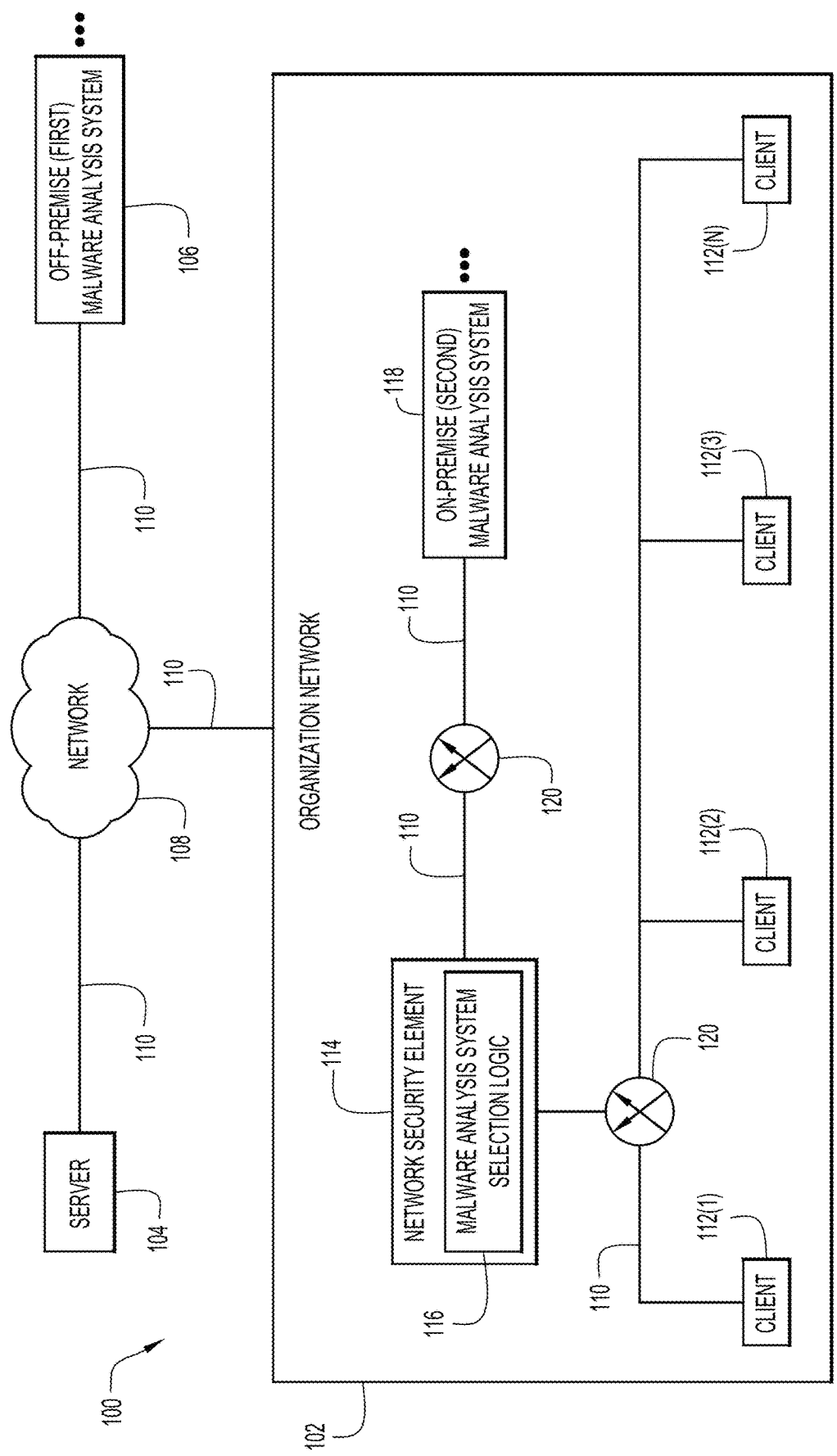
FIG. 1 is block diagram of a system for selecting between at least first and second malware analysis systems to analyze a file, according to an example embodiment.

With reference made to FIG. 1, shown is a block diagram of a system 100 for selecting a malware analysis system to analyze a file, according to an example embodiment. The system 100 includes an organization network 102, a server 104, and an off-premise malware analysis system 106. The organization network 102, the server 104, and the off-premise malware analysis system 106 may communicate with each other via a network 108. The network 108 may be a local area network (LAN), a wireless local area network (WLAN), a wide area network (WAN), or a metropolitan area network (MAN), etc. The organization network 102, server 104, and off-premise malware analysis system 106 may communicate with the network 108 via communication links 110. The communication links 110 may be wired communication links, wireless communication links, or a combination of wired and wireless communication links.

The organization network 102 may include a number of elements, devices, etc. For example, the organization network 102 includes a plurality of clients 112(1)-112(N). Also included within the organization network 102 is a network security element 114 in communication with the plurality of clients 112(1)-112(N). The network security element 114 includes malware analysis system selection logic 116, the operations of which are described in more detail herein. Also reachable from the network security element 114 is an on-premise malware analysis system 118, described in more detail below. Communication links 110 may be used to connect the plurality of clients 112(1)-112(N), the network security element 114, and the on-premise malware analysis system 118 via one or more network elements 120, such as a router or a switch.

The off-premise malware analysis system 106 may be arbitrarily considered a "first" malware analysis system and the on-premise malware analysis system may be considered a "second" malware analysis system. Again, there may be multiple malware analysis systems on-premise and/or multiple malware analysis systems off-premise.

A malware analysis system, such as off-premise malware analysis system 106 or on-premise malware analysis system 118, may include any system that includes a bias in its analysis, is computationally expensive, or benefits from centralization. Specific examples of malware analysis systems may include malware analysis sandboxes. In other embodiments, the malware analysis system may include a neural network or a machine learning system to perform the malware analysis.

In general, the plurality of clients 112(1)-112(N) may include any device capable of sending and receiving network communications. The network communications may include communicating a variety of file types, such as .exe, .docx, .zip, etc. For example, the plurality of clients 112 may be computing devices, such as a desktop computer, a laptop computer, a smartphone, a tablet, a client application, etc., associated with or used by users of the organization.

The network security element 114 generally may include any device that is capable of, or configured to, receive and forward network communications and execute the malware analysis system selection logic 116. Examples of network security element 114 may be a firewall, such as a next-generation firewalls (NGFW) and intrusion prevention system (IPS), such as next-generation intrusion prevention systems (NGIPS). In other aspects, the network security element 114 may be a router, a switch, a server, or other network security device.

In one aspect, the off-premise malware analysis system 106 and the on-premise malware analysis system 118 are security mechanisms for separating files or programs to mitigate system failures or prevent software vulnerabilities from spreading. For example, the off-premise malware analysis system 106 and the on-premise malware analysis system 118 may execute an untested file to determine whether the file presents a security risk. In one example, the server 104 may be an email server. The client 112(1) may receive an email with an attachment from an unknown email address via the server 104. Before the email and the attachment are received at the client 112(1), the network security element 114 may intercept the email and the attachment. The network security element 114, using the malware analysis system selection logic 116, may provide (send) the attachment to either the off-premise malware analysis system 106 or the on-premise malware analysis system 118. The attachment may then be analyzed by the selected malware analysis system to determine whether the attachment poses a security risk. If the selected malware analysis system determines that the attachment poses a security risk, then the selected malware analysis system may inform the network security element 114 of the risk. The network security element 114 may then perform an action on the attachment, such as quarantining the attachment, blocking the connection between client 112(1) and server 104, and/or informing a user of the client 112(1) that the attachment has been quarantined, that the connection has been blocked, or that the attachment poses a security risk. However, if the selected malware analysis system determines that the attachment does not pose a security risk, it may inform the network security element 114 that the attachment does not pose a security risk. The network security element 114 may then provide (forward) the attachment to the client 112(1).

The on-premise malware analysis system 118 may be referred to as on-premise because it may be internal to, or part of, the organization network 102. One benefit of an on-premise malware analysis system 118 is that, because the on-premise malware analysis system 118 is internal to the organization network 102, files that are sent to the on-premise malware analysis system 118 remain private and fully controlled by the organization. However, malware analysis systems may require significant processing capabilities and, therefore, it may be computationally expensive to maintain the on-premise malware analysis system 118.

In contrast, the off-premise malware analysis system 106 may be referred to as off-premise because it may be external to the organization network 102. For example, the off-premise malware analysis system 106 may be a part of a public cloud computing service that is owned and/or operated by an entity other than the entity that owns and/or operates the organization network 102. One benefit of the off-premise malware analysis system 106 is that because it is owned and/or operated by another entity, which may share use of the off-premise malware analysis system 106, the cost to the organization may be significantly less than the cost of owning and operating the on-premise malware analysis system 118. However, since use of the off-premise malware analysis system 106 may be shared by multiple organizations, the privacy or confidentiality of the files sent to the off-premise malware analysis system 106 may be less definitive than that of the on-premise malware analysis system 118.

In other words, a distinguishing characteristic between the off-premise malware analysis system 106 and the on-premise malware analysis system 118 is the logical (and possibly physical) location of the respective malware analysis systems within the system 100. The off-premise malware analysis system 106 is logically outside the organization network 102 while the on-premise malware analysis system 118 is logically within the organization network 102.

FIG. 1 shows that the network security element 114 is between a client (one of clients 112(1)-112(N)) and a server (server 104) as the device submitting the sample to the selected malware analysis system. However, there is another possible configuration in which some functions of the network security element 114 described herein are performed by a software agent running on the client or the server and other functions are performed by agent control and submission logic running on an entity in the cloud. For example, a client may request a file from the server 104. The software agent running on the client captures the file for analysis based on instruction from the cloud-based agent control and submission logic. At this point, the cloud-based agent submission logic acts like a network device and using a routing protocol, determines whether and where the file should be sent for malware analysis (the first malware analysis system 106 or the second malware analysis system 118).

Figure 2:
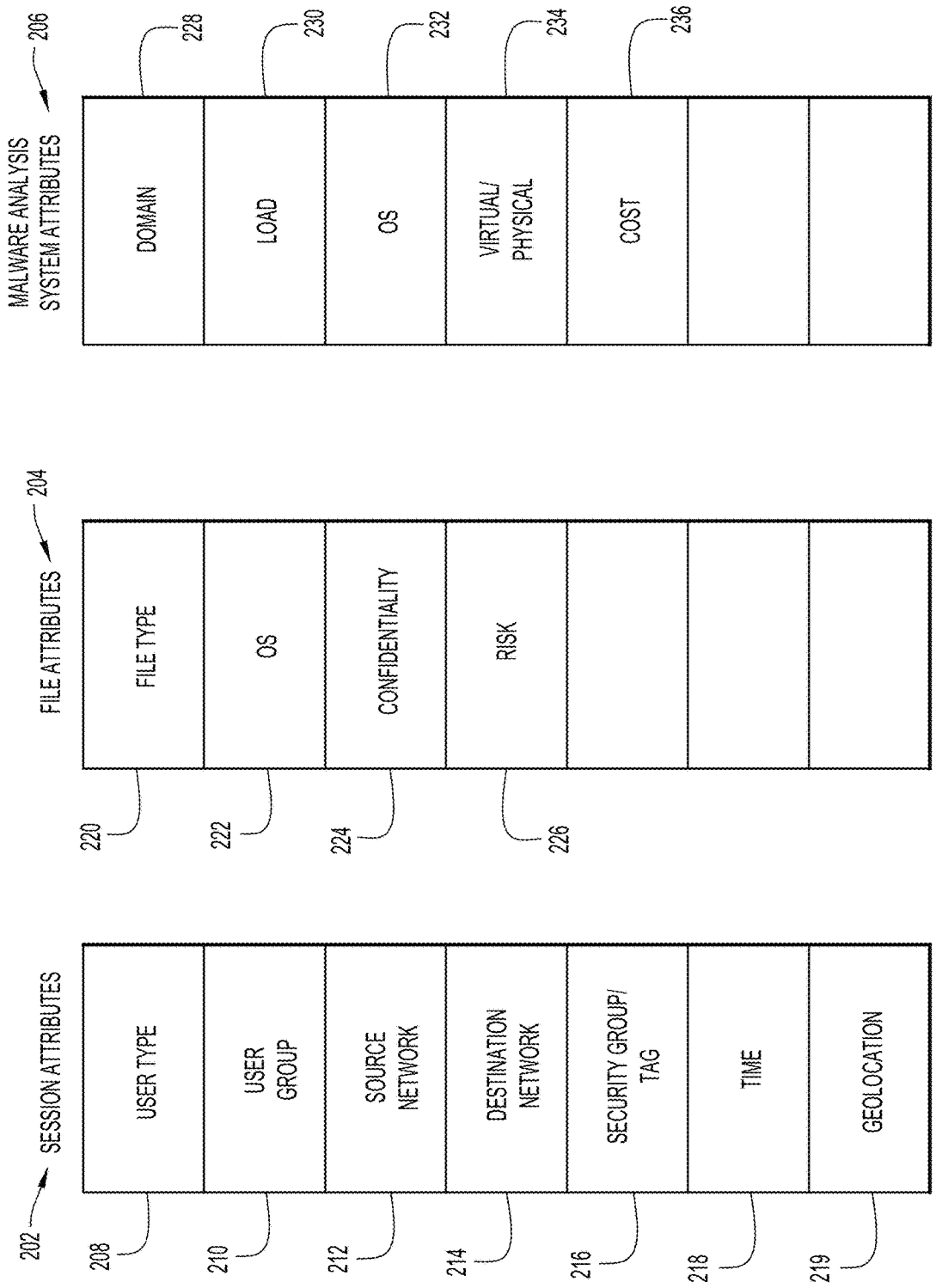
FIG. 2 illustrates a mapping of session attributes, file attributes, and malware analysis system attributes, according to an example embodiment.

Turning to FIG. 2, and with continuing reference to FIG. 1, session attributes 202, file attributes 204, and malware analysis system (either on-premise or off-premise) attributes 206 which are arranged to be analyzed by the malware analysis system logic 116 are shown, according to an example embodiment. The malware analysis system selection logic 116 may track session attributes 202 of communication sessions between the plurality of clients 112 and the server 104. Such session attributes 202 may include a user type 208, a user group 210, a source network 212, a destination network 214, a security group tag 216, time 218, and geolocation 219.

For example, the user type 208 may be a status, such as a user identity. The user identity may be used when evaluating whether the file should be sent to a malware analysis system. The user group 210 may be a group to which the user of the client 112 belongs. For example, the user may be a part of an "Accounting" user group for an organization. The source network 212 may be a network identifier from which the file originated. The source network 212 may be based on, for example, an Internet Protocol (IP) address. For example, if the file originates from the organization network 102, the source network 212 may indicate that the file originated from the organization network 102. Moreover, in some embodiments, the source network 212 may indicate a specific subnetwork of the organization network 102 from which the file originates. The destination network 214 may be a network identifier to which the file is destined. Like the source network 212, the destination network 214 may also be based on an IP address. For example, if the file is destined for the organization network 102, the destination network 214 may indicate that the file is destined for the organization network 102. In some embodiments, the destination network 214 may indicate a specific subnetwork of the organization network 102 to which the file is destined. The security group tag 216 may be, for example, a source identity marker. The time 218 may be a time that the communication session first started. Alternatively, the time 218 may indicate a time that a file was last sent within the communication session. The geolocation 219 may be based on an office location, such as a city, a state, a country, or a region, such as North America.

It should be appreciated that these are non-limiting examples of session attributes 202 that the malware analysis system selection logic 116 may evaluate when determining whether the file should be sent to the off-premise malware analysis system 106 or to the on-premise malware analysis system 118 for analysis.

In addition to evaluating the session attributes 202, the malware analysis system selection logic 116 may also analyze file attributes 204 of the file sent during a communication session. File attributes 204 may include a file type 220, an operating system (OS) 222, a confidentiality level 224, and a risk 226. The file type 220 may indicate the type of file. For example, the file type 220 may be based on a file extension, such as .docx, .zip, .exe, etc. The file type 220 may also be based on whether the file is a Portable Executable (PE) file, which is configured to run natively on Microsoft Windows® or the file may be an Executable and Linkable Format (ELF) file, which is configured to run natively on Linux. The operating system 222 may indicate a generic class of operating systems on which the file is configured to execute. For example, the file may be configured to run only on Microsoft Windows® but not Linux. The confidentiality level 224 may indicate whether the file has any sort of confidentiality. For example, confidentiality levels of a file may be low, medium, and high. A file that does not have a specified confidentiality may be set to a confidentiality level of low. In contrast, health records or material protected by attorney-client privilege, which may be subject to a high level of confidentiality, may have a confidentiality level of high. Finally, the risk 226 may be generated based on the file attributes 204 and/or as a result of a static analysis of the file. For example, the risk 226 may take various values, such as low, medium, or high, based on the file attributes 204 and/or static analysis of the file. The risk 226 may be used in determining whether the file should be sent to a malware analysis system (either off-premise or on-premise) for analysis.

It should be appreciated that these are non-limiting examples of file attributes 204 that the malware analysis system selection logic 116 may evaluate when determining whether the file should be sent to the off-premise malware analysis system 106 or to the on-premise malware analysis system 118 for analysis.

In addition to evaluating the session attributes 202 and the file attributes 204, the malware analysis system selection logic 116 may evaluate the malware analysis system attributes 206. The off-premise malware analysis system 106 or the on-premise malware analysis system 118 may advertise their respective attributes to the malware analysis system selection logic 116, as will be described in more detail herein. The malware analysis system attributes 206 may include a domain 228, a load 230, an OS 232, whether the off-premise malware analysis system 106 or the on-premise malware analysis system 118 is a physical machine or a virtual machine 234, and a cost 236 of using the off-premise malware analysis system 106 or the on-premise malware analysis system 118.

The domain 228 may indicate whether the malware analysis system is private or public. For example, a private malware analysis system may indicate that the malware analysis system may only be used by the organization. On the other hand, a public malware analysis system may indicate that the malware analysis system may be used by more than one organization. In one aspect, the on-premises malware analysis system 118 may have a private domain attribute, indicating that only clients 112 within the organization network 102 may use the on-premise malware analysis system 118. In contrast, the off-premises malware analysis system 106 may have a public domain attribute, indicating that clients within and without the organization network 102 may use the off-premise malware analysis system 106. These are only example values and it should be appreciated that the on-premise malware analysis system 118 may have a public domain attribute and the off-premise malware analysis system 106 may have a private domain attribute.

The malware analysis system attributes 206 may further include the load 230 on the off-premise malware analysis system 106 or the on-premise malware analysis system 118. The load 230 may indicate the current workload of the off-premise malware analysis system 106 or the on-premise malware analysis system 118. For example, the load 230 may be expressed in terms of a number of file submissions received per hour. Alternatively, or additionally, the load 230 may be expressed in terms of a remaining processing capacity, such as a number of file submissions the off-premise malware analysis system 106 or on-premise malware analysis system 118 may process before reaching a processing limit.

The malware analysis system attributes 206 may also include one or more OS's 232 supported by the off-premise malware analysis system 106 or the on-premise malware analysis system 118. For example, the off-premise malware analysis system 106 may be able to execute files for Microsoft Windows 8 and 10 but not for Apple MacOS® while on-premise malware analysis system 118 may only execute files for Apple MacOS. The OS 232 may determine the types of files that the malware analysis system may analyze.

The malware analysis system attributes 206 may further include whether the off-premise malware analysis system 106 or the on-premise malware analysis system 118 is a physical machine or a virtual machine 234. For example, the off-premise malware analysis system 106 may be a physical machine, i.e., a malware analysis system with software executing on its own dedicated hardware. In contrast, the on-premise malware analysis system 118 may be a virtual machine (VM), i.e., a malware analysis system executing on a virtualized, or software, machine.

The malware analysis system attributes 206 may also include the cost 236, which indicates a cost for submitting a file for analysis to the off-premise malware analysis system 106 or the on-premise malware analysis system 118. For example, the cost 236 may be in absolute dollar terms. In another embodiment, the cost 236 may be on a scale from, for example, 0-20, with a higher number indicating a higher cost.

It should be appreciated that these are non-limiting examples of malware analysis system attributes 206 that the malware analysis system selection logic 116 may evaluate when determining whether the file should be sent to the off-premise malware analysis system 106 or the on-premise malware analysis system 118 for analysis.

The malware analysis system selection logic 116 may analyze the file attributes 204 as well as the session attributes 202 to determine a value for the risk 226 attribute. For example, files originating from or going to a certain network may be more likely to pose security threats than other networks. When such higher risk networks are involved in the session, the malware analysis system selection logic 116 may indicate that the risk 226 of the file is increased. In contrast, a static analysis of the file may indicate that the file is less likely to pose a security threat. When the malware analysis system selection logic 116 makes such a determination, the risk 226 posed by the file may be decreased. It should be appreciated that the malware analysis system selection logic 116 may evaluate some or all of the session attributes 202 and the file attributes 204 to determine whether the file should be analyzed by either the off-premise malware analysis system 106 or the on-premise malware analysis system 118.

The risk 226 may be compared against a risk threshold to determine whether the file should be analyzed by a malware analysis system (either off-premise or on-premise). For example, if the risk 226 of the file is greater than the risk threshold, then the malware analysis system selection logic 116 may determine that the file is to be analyzed by a malware analysis system and selects either the off-premise malware analysis system 106 or the on-premise malware analysis system 118 to analyze the file. However, if the risk 226 of the file is less than the risk threshold, then the malware analysis system selection logic 116 may determine that the file is not to be analyzed by a malware analysis system and forwards the file to its destination.

Turning to FIG. 3, and with continuing reference to FIGS. 1 and 2, a routing table 300 is shown with example attributes and attribute values stored in the malware analysis system selection logic 116, according to an example embodiment. In one embodiment, the off-premise malware analysis system 106 and/or the on-premise malware analysis system 118 may register with the malware analysis system selection logic 116. Alternatively, the network security element 114 may register with the off-premise malware analysis system 106 or the on-premise malware analysis system 116. In one embodiment, the registration of the off-premise malware analysis system 106 and the on-premise malware analysis system 118 may include the respective attributes and attribute values. In another embodiment, the respective attributes and attribute values may be included within a routing advertisement from the off-premise malware analysis system 106 or the on-premise malware analysis system 118 to the network security element 114. The registrations may be performed manually, i.e., a user of the malware analysis system selection logic 116 may register the off-premise malware analysis system 106 or the on-premise malware analysis system 118. In another embodiment, the registrations may be performed automatically, i.e., the network security element 114 exchanges registration messages with the off-premise malware analysis system 106 or the on-premise malware analysis system 118. It should be appreciated that some of the malware analysis systems may register manually while others may register automatically.

The routing table 300 may include an entry for each registered malware analysis system. As shown in FIG. 3, four malware analysis systems are registered with the malware analysis system selection logic 116. Each entry may have a plurality of attributes for the respective malware analysis system. For example, after the off-premise malware analysis system 106 and the on-premise malware analysis system 118 have registered with the malware analysis system selection logic 116, the off-premise malware analysis system 106 and the on-premise malware analysis system 118 may advertise attributes to the malware analysis system selection logic 116 via, for example, routing advertisements. The advertised attributes may be included within the entry for the respective malware analysis system, as shown in FIG. 3. For example, the attributes may include an IP address 302 of the malware analysis system, the domain 228, the OS's 232 supported by the malware analysis system, a geolocation 304, the cost 236, a time the malware analysis system was last sent a file submission 306, a remaining processing capacity 308, a processing capacity reset time 310, a usage rate 312, and efficacy 314. While four system entries 320, 322, 324, and 326 are in routing table 300, only malware analysis system entry 320 will be comprehensively described as the other malware analysis system entries have a similar description. It should be appreciated that not all of these attributes may be advertised by each malware analysis system. Additionally, it should be appreciated that other attributes that may be analyzed may be sent to the malware analysis system selection logic 116.

For example, entry 320 indicates that the IP address 302 of the registered malware analysis system is 192.168.1.10 and that it is in a private domain 228. Additionally, entry 320 indicates that the OS's 232 that the malware analysis system supports are Microsoft Windows 7, 8, and 10 and Apple MacOS. Further, the registered malware analysis system associated with entry 320 has a geolocation 304 of the United States and has a cost metric 236 of 20. Here, the cost metric 236 is expressed as a unitless number. As described herein, the cost metric 236 may be expressed as a range of relative costs. Compared to the cost metric 236 for entries 322, 324, and 326, the malware analysis system associated with entry 320 is the most expensive. However, the cost metric 236, in this example, does not indicate the absolute monetary cost. The entry 320 also indicates that this malware analysis system was last used 306 on July 31 at 10:01:01 AM. Additionally, there are no limits on a processing capacity 308 of this registered malware analysis system. In one embodiment, the processing capacity 308 may be set in, for example, a submissions contract between the organization and the entity that owns/operates the malware analysis system. The submissions contract may limit the processing capacity available to an organization to a portion of the malware analysis system's total processing capacity. Moreover, a next capacity reset time 310 for this registered malware analysis system is July 31 at 12:00:00 PM. Further, the usage rate 312 of this malware analysis system is 10 samples per hour and it has an efficacy rate 314 of 90%. The efficacy rate may be based on, for example, a number of true and false positives. Alternatively, or additionally, the efficacy rate may be based on true and false negatives. Analogous attributes and values correspond to the entries 322, 324, 326 in the routing table 300.

Figure 4:
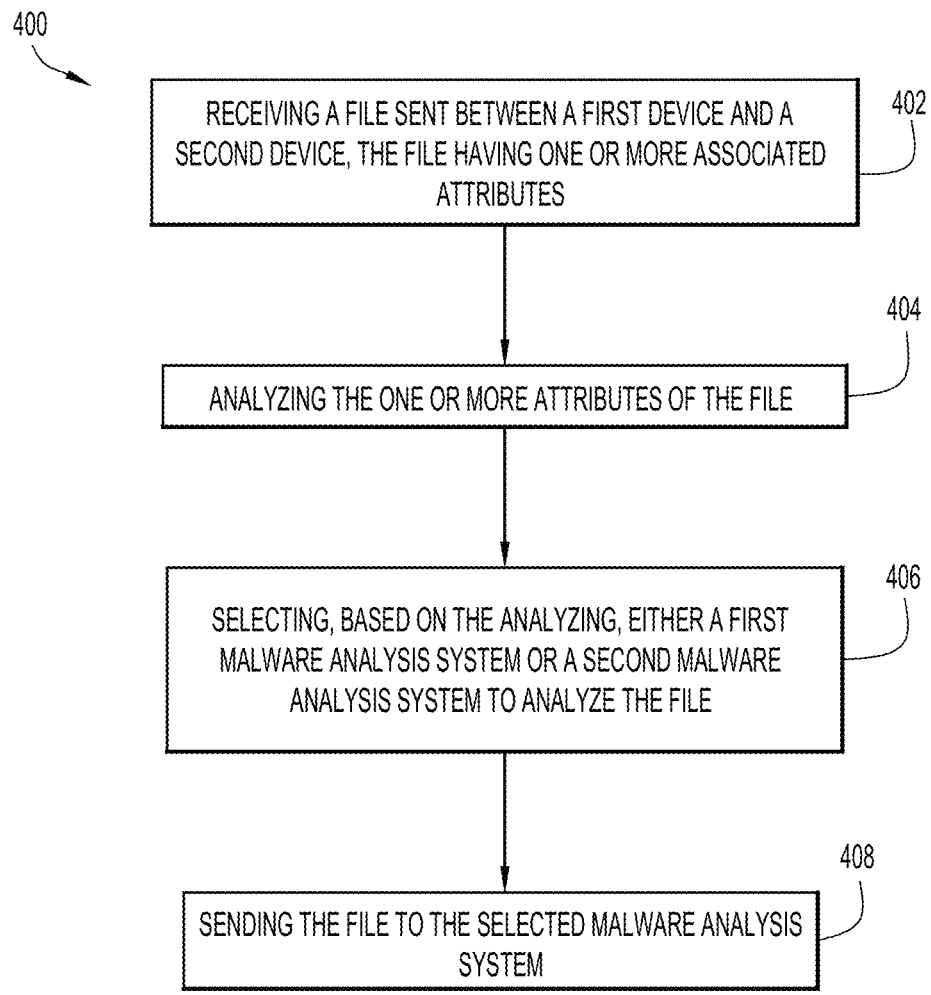
FIG. 4 shows a high-level flowchart of a method for malware analysis system selection, according to an example embodiment.

Turning to FIG. 4, and with continuing reference to FIGS. 1-3, a high-level flowchart is described of a method 400 for malware analysis system selection, according to an example embodiment. The method 400 begins at operation 402, at which the malware analysis system selection logic 116 may obtain (receive) a file that is sent between a first device, such as one of the plurality of clients 112(1)-112(N), and a second device, such as the server 104. For example, the client 112(1) may receive an email that is routed via the server 104. The email may have an attachment, such as an .exe file. The .exe file may have one or more file attributes 204 associated with it. The file attributes 204 may include one or more of the attributes described with reference to FIG. 2. After operation 402 is complete, the method 400 may proceed to operation 404.

At operation 404, the malware analysis system selection logic 116 analyzes the file attributes 204. For example, the .exe file described with reference to operation 402 may be configured to execute on a Windows OS. Other file attributes 204 may indicate that there are no confidentiality requirements. After operation 404 is complete, the method 400 may proceed to operation 406.

At operation 406, the malware analysis system selection logic 116 may select, based on the analysis in operation 404, either first malware analysis system 106 or the second malware analysis system 118 as a selected malware analysis system to send the file for malware analysis. For example, continuing with the .exe file example described above, the malware analysis system selection logic 116 selects a malware analysis system that is capable of executing an .exe file. For example, the malware analysis system selection logic 116 may select a malware analysis system that is capable of executing Windows files. Because there are no confidentiality restrictions associated with the file, the malware analysis system selection logic 116 may select a malware analysis system regardless of what levels of confidentiality the malware analysis system supports. In one aspect, the selecting performed by the malware analysis system selection logic 116 may result in load balancing files between the first malware analysis system 106 and the second malware analysis system 118. After operation 406 is complete, the method 400 may proceed to operation 408.

At operation 408, the malware analysis system selection logic 116 provides (sends) the file to the malware analysis system selected in operation 406 for analysis. After operation 408 is complete, the method 400 may end.

In this manner, the malware analysis system selection logic 116 enables an organization to selectively choose which malware analysis system, either the off-premise (first) malware analysis system 106 or the on-premise (second) malware analysis system 118, to send the file for malware analysis. In other words, the organization is not limited to selecting exclusively the off-premise malware analysis system 106 or the on-premise malware analysis system 118. Such a technical advance results in a number of technical improvements. For example, if the on-premise malware analysis system 118 has already reached its processing capacity, the malware analysis system selection logic 116 may choose to send the file to be analyzed at the off-premise malware analysis system 106 rather than simply forwarding the file without undergoing malware analysis. Therefore, the security of the organization network 102 is increased. Alternatively, the file may be entered into a queue and the receiving device would have to wait until the on-premise malware analysis system 118 has sufficient processing capacity to analyze the file. This may result in long delays to receive the file. However, this technological advance also improves the performance of the organization network 102 by sending the file for analysis to the off-premise malware analysis system 106 rather than putting it into a queue of the on-premise malware analysis system 118.

As explained above, the selection performed at operation 406 need not between off-premise and on-premise malware analysis systems. It may be that there are a plurality of on-premise malware analysis systems and the selecting operation 406 involves selecting one of the plurality of on-premise malware analysis systems for any of a variety reasons, including load, capabilities, etc. Conversely, there may be a plurality off-premise malware analysis systems and the selecting operation 406 involves selecting one of the plurality of off-premise malware analysis systems for any of a variety of reasons, including load, capabilities, etc.

Figure 5:
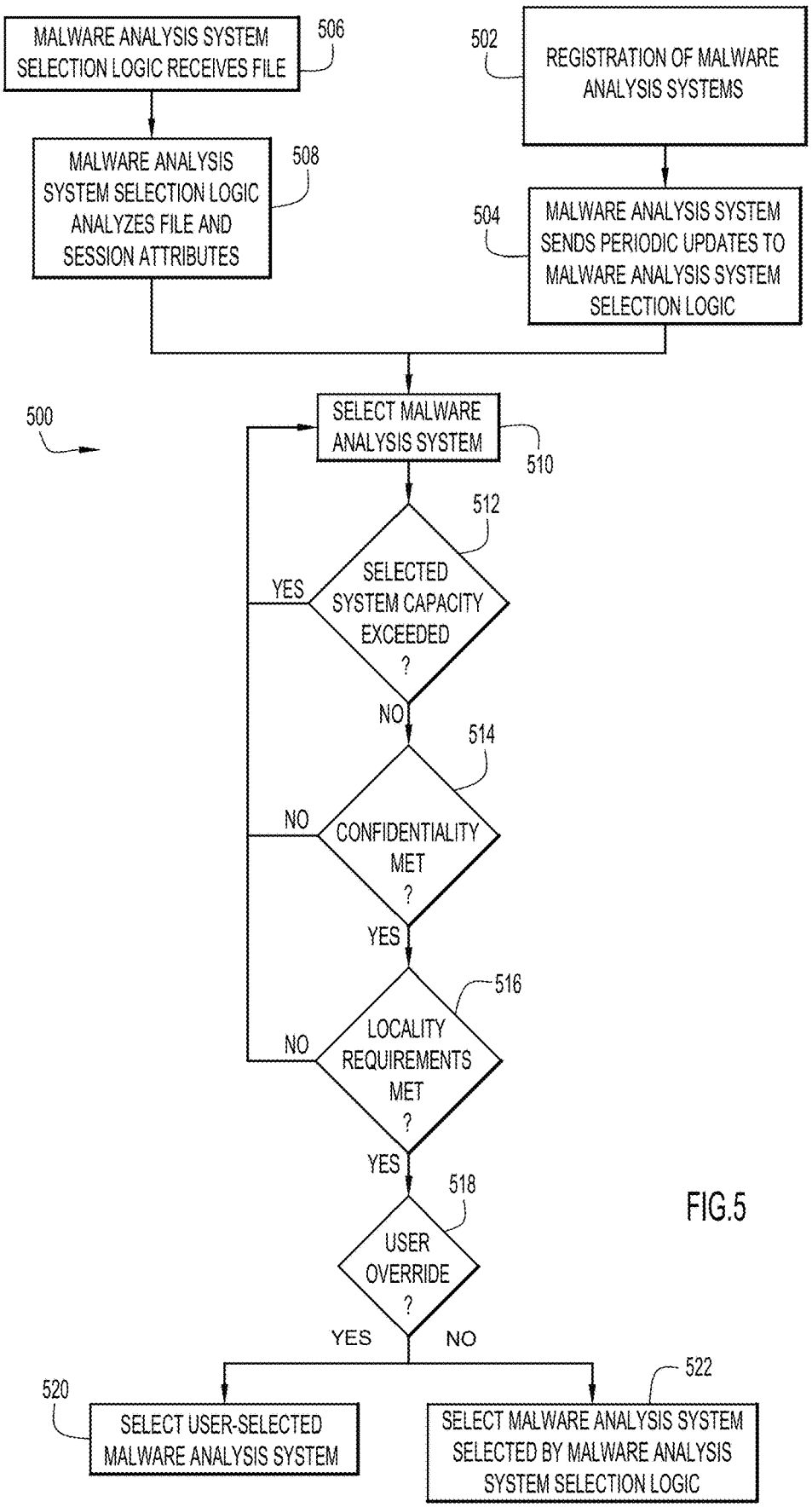
FIG. 5 shows a flowchart of another method for malware analysis system selection, according to an example embodiment.

Turning to FIG. 5, a flowchart of a method 500 for selecting a malware analysis system to analyze a file is shown, according to another example embodiment. Reference is also made to FIGS. 1-3 for purposes of the description of FIG. 5. The method 500 may include two parallel paths, a first path beginning at operation 502 and a second path beginning at operation 506.

Beginning with the first path at operation 502, the off-premise malware analysis system 106 or the on-premise malware analysis system 118 register with the malware analysis system selection logic 116. Alternatively, as described above, the malware analysis system selection logic 116 may register with the off-premise malware analysis system 106 and the on-premise malware analysis system 118. The registration may include one or more attributes associated with the off-premise malware analysis system 106 and the on-premise malware analysis system 118. The one or more attributes may be advertised using a routing advertisement. For example, the attributes may include the malware analysis system attributes 206 described in FIG. 2 and/or the attributes included in the routing table 300. After operation 502 is complete, the method 500 may proceed to operation 504.

At operation 504, the off-premise malware analysis system 106 or the on-premise malware analysis system 118 may send updates to the malware analysis system selection logic 116. These updates may be sent periodically. Non-periodic updates may be sent when, for example, one or more of the malware analysis system attributes 206 associated with the off-premise malware analysis system 106 or the on-premise malware analysis system 118 changes, such as if a load 230 on one of the malware analysis systems changes. In addition to providing feedback of malware analysis system attributes 206, the off-premise malware analysis system 106 and the on-premise malware analysis system 118 may also provide metrics of one or more key performance indicators (KPIs). In one aspect, the KPIs may include the malware analysis system attributes 206. For example, one attribute of the malware analysis systems may be an average expected runtime, which may indicate an estimated time it takes to analyze a file submission. One KPI of the malware analysis systems may be an average response time, which may be the actual average time it takes to analyze a file submission. Another KPI may be a security efficacy rate. After operation 504 is complete, the first path of method 500 may proceed to operation 510.

The second path begins at operation 506. In operation 506, the malware analysis system selection logic 116 may receive a file. For example, the file may be sent from one of the clients, such as client 112(1), to the server 104. Alternatively, the file may be sent from the server 104 to one of the clients, such as client 112(1). As described herein, the file may be any type, such as an .exe, .zip, or .pdf file. After operation 506 is complete, the method 500 may proceed to operation 508.

At operation 508, the malware analysis system selection logic 116 may analyze the file and optionally extract metadata from the file. The classification and extracted metadata may be used in determining a security risk posed by the file. For example, the malware analysis system selection logic 116 may analyze the file attributes 204 described above in connection with FIG. 2. In another aspect, the malware analysis system selection logic 116 may also analyze session attributes 202 to determine the security risk posed by the file. For example, the malware analysis system selection logic 116 may analyze the session attributes 202 also described with reference to FIG. 2. In another embodiment, the risk of the file may be set by a source of the file. In this case, the risk of the file may be determined based on, for example, where the file was downloaded from or if the file is code signed. After operation 508 is complete, the second path of method 500 may proceed to operation 510.

At operation 510, the malware analysis system selection logic 116 selects either the off-premise malware analysis system 106 or the on-premise malware analysis system 118 to analyze the file. The malware analysis system selection logic 116 may consider some or all of the session attributes 202, file attributes 204, and malware analysis system attributes 206, as described herein. After the malware analysis system selection logic 116 selects a malware analysis system in operation 510, the method 500 may proceed to operation 512.

At operation 512, the malware analysis system selection logic 116 determines, based on the feedback provided by the off-premise malware analysis system 106 or the on-premise malware analysis system 118, whether the malware analysis system selected in operation 510 has exceeded its processing capacity. If the selected malware analysis system does not have sufficient processing capacity to analyze the file, the method 500 returns to operation 510, where the malware analysis system selection logic 116 may select another malware analysis system. If the malware analysis system selection logic 116 determines that the malware analysis system selected in operation 510 has sufficient processing capacity, then the method 500 may proceed to operation 514.

At operation 514, the malware analysis system selection logic 116 determines whether the selected malware analysis system meets conditions regarding the confidentiality of the file. For example, the file may be a patient's health record, which may be subject to strict confidentiality standards. If the selected malware analysis system fails to satisfy the confidentiality standards of the file, then the method 500 may return to operation 510, where the malware analysis system selection logic 116 selects a different malware analysis system. However, if the selected malware analysis system meets the confidentiality requirements of the file, then the method 500 may proceed to operation 516.

At operation 516, the malware analysis system selection logic 116 determines whether the selected malware analysis system meets the geolocation conditions of the file. For example, the file may be restricted to the United States. If the selected malware analysis system fails to satisfy the location requirements of the file, by, for example, being located outside of the United States, then the method 500 may return to operation 510, where the malware analysis system selection logic 116 selects a different malware analysis system. However, if the selected malware analysis system meets the geolocation requirements of the file, then the method 500 may proceed to operation 518.

At operation 518, the malware analysis system selection logic 116 may determine whether an override, such as a user override, for the file is present. For example, a user may configure the malware analysis system selection logic 116 to send all files that are restricted to the United States to the on-premise malware analysis system 118. If such an override is present, then the method 500 may proceed to operation 520.

At operation 520, the malware analysis system selection logic 116 selects as the malware analysis system to analyze the file the malware analysis system indicated in the override. Continuing the example from operation 518, the malware analysis system selection logic 116 may have selected, in operation 510, the off-premise malware analysis system 106. Because there is an override, here a user-configured override, the malware analysis system selection logic 116 selects the on-premise malware analysis system 118 to analyze the file instead of the previously-selected off-premise malware analysis system 106.

Returning to operation 518, if there is no override, then the method 500 proceeds to operation 522. At operation 522, the malware analysis system selection logic 116 selects as the malware analysis system to analyze the file the malware analysis system selected in operation 510. After operations 520 and 522, the method 500 ends.

Figure 6:
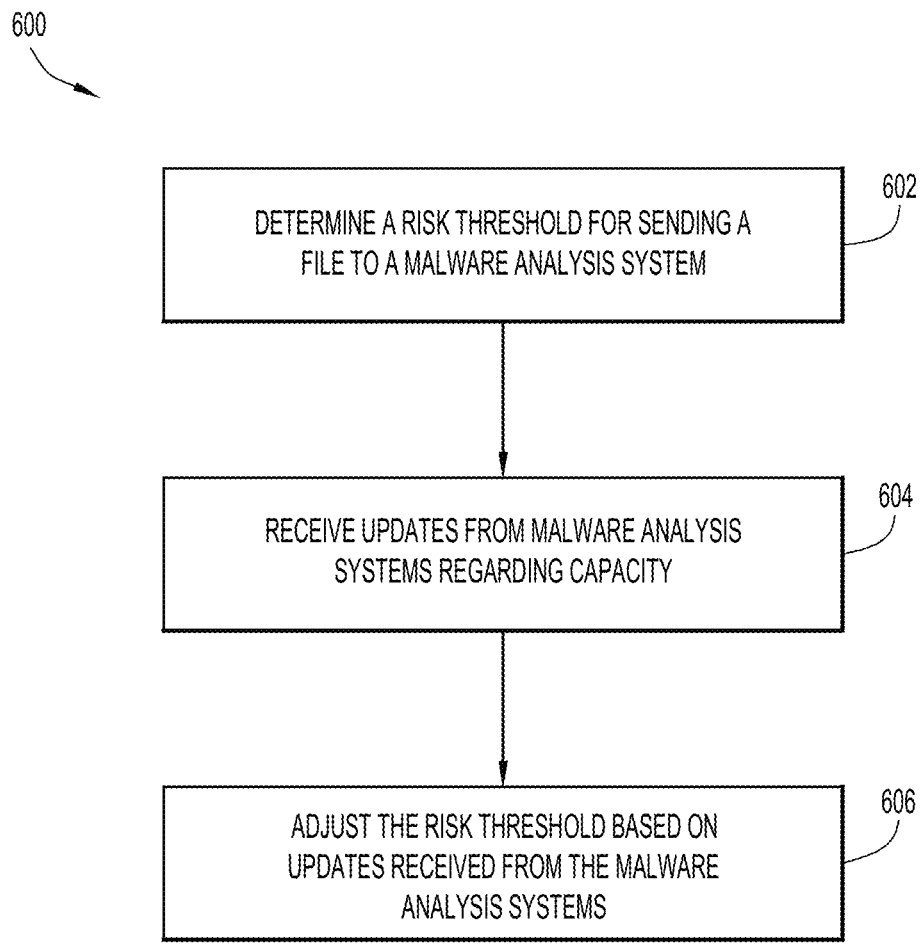
FIG. 6 illustrates a flowchart of a method for controlling a number of files submitted to a given malware analysis system, according to an example embodiment.

Turning to FIG. 6, a flowchart is shown of a method 600 for controlling a number of files submitted to a given malware analysis system, according to an example embodiment. The method 600 begins at operation 602. At operation 602, the malware analysis system selection logic 116 determines a risk threshold for sending a file to a malware analysis system for analysis. For example, a combination of session attributes 202 and file attributes 204 may indicate that a security risk posed by the file is very low. In such a scenario, there may be very little benefit to sending the file to a malware analysis system and yet incur a cost for analyzing the file. Therefore, such a file may not meet the risk threshold for sending a file to a malware analysis system. In other words, the risk threshold may be used to establish a minimum security risk posed by a file in order to send the file to a malware analysis system. In one aspect, when the malware analysis system selection logic 116 is first initiated, the risk threshold may be set to the lowest level. Therefore, the malware analysis system selection logic 116 may send all files to the malware analysis systems. After operation 602 is complete, the method 600 may proceed to operation 604.

At operation 604, the malware analysis system selection logic 116 receives updates from one or more of the malware analysis systems regarding the processing capacity for each malware analysis system. As the number of files submitted to a given malware analysis system increases, the updates provided by the given malware analysis system may indicate that the malware analysis system will reach its processing capacity limit before the next capacity limit reset time. In other words, if the malware analysis system selection logic 116 continues to send files to the malware analysis system at the current rate, the malware analysis system will not be able to analyze all of the files because it will reach its processing capacity limit. In contrast, the malware analysis system may send updates to the malware analysis system selection logic 116 that it will not reach its processing capacity before the next processing capacity reset time.

The malware analysis systems may use various algorithms to determine, or predict, when a processing capacity will be reached before the processing capacity reset time. For example, in one aspect, a linear extrapolation from a current time to the capacity reset time may be used to predict when a given malware analysis system will reach its processing capacity. In another aspect, the malware analysis systems may consider historical usage based upon, for example, the day of the week and a typical usage during that day. For example, a submission pattern for Wednesday afternoons for a given malware analysis system may be established based on the historical usage of the given malware analysis system. This submission pattern may be used to predict when the given malware analysis system will reach its processing capacity on a Wednesday afternoon given a current load. By using submission patterns, oversubscribing to more expensive malware analysis systems while under-subscribing to less expensive malware analysis systems may be avoided. For example, a less expensive malware analysis system may be currently experiencing a relatively high load while a more expensive malware analysis system may be currently experiencing a relatively low load. However, historical submission patterns may indicate that the less expensive malware analysis system will soon experience a relatively low load while the more expensive malware analysis system will soon experience a relatively high load. The malware analysis system selection logic 116 may send a file to the less expensive malware analysis system because, based on the submission pattern for the less expensive malware analysis system, the less expensive malware analysis system will have excess processing capacity. In this manner, the malware analysis system selection logic 116 may avoid over-subscribing to the more expensive malware analysis system while under-subscribing to the less expensive malware analysis system. After operation 604 is complete, the method 600 may proceed to operation 606.

At operation 606, the malware analysis system selection logic 116 adjusts the risk threshold based on the updates received from the malware analysis systems. For example, if a given malware analysis system indicates that it will reach its processing capacity limit before the next processing capacity limit reset time, then the malware analysis system selection logic 116 may increase the risk threshold. By increasing the risk threshold, the malware analysis system selection logic 116 reduces the number of files it sends to the malware analysis system for analysis. In one aspect, as the processing capacity of the malware analysis system increases due to, for example, the processing capacity being reset or the reduced rate of files submitted to the malware analysis system, previously queued files may be submitted for analysis.

Figure 7:
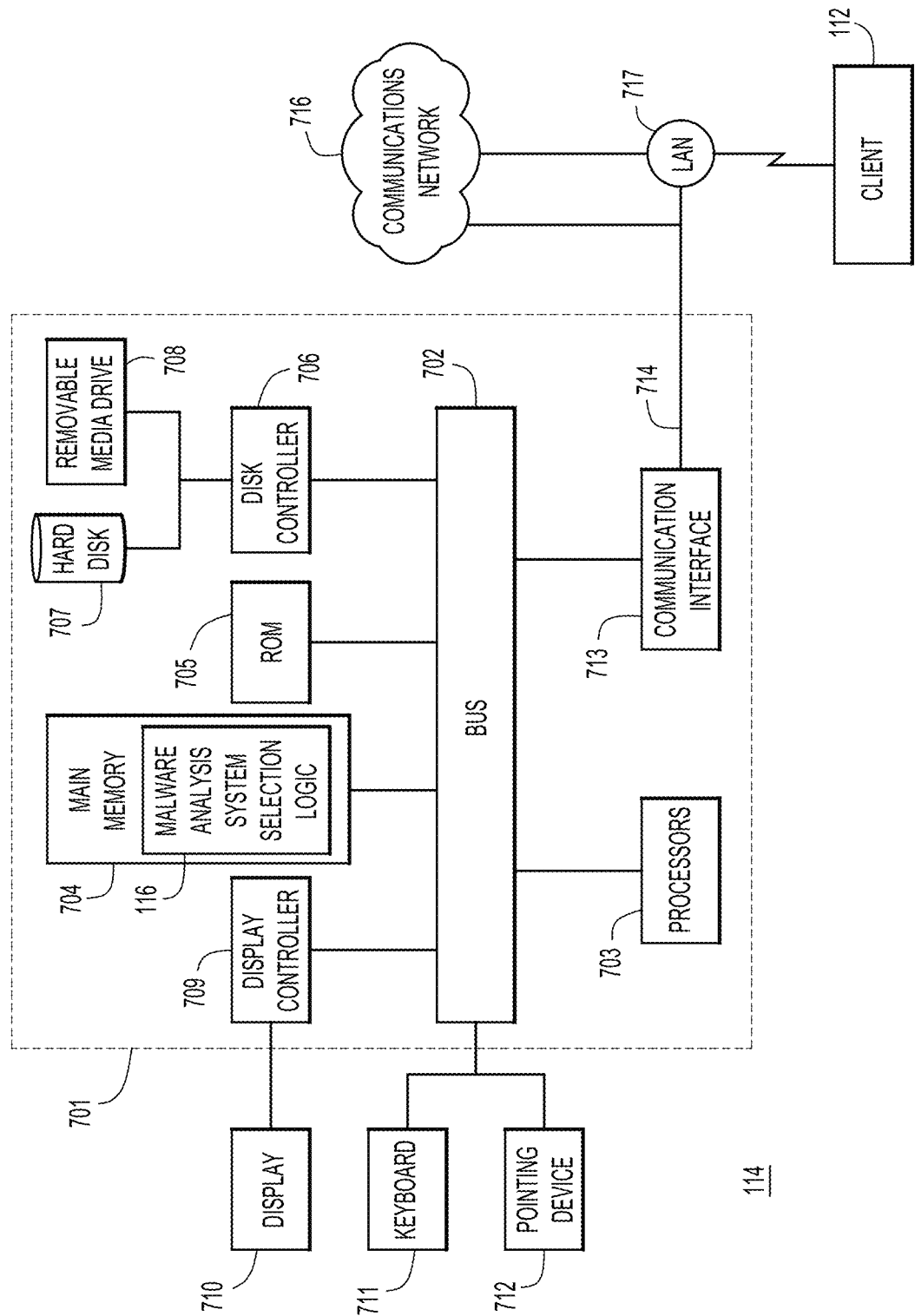
FIG. 7 is a block diagram of a network security apparatus configured to perform malware analysis system selection techniques, according to an example embodiment.

Turning to FIG. 7, a block diagram is shown of the network security element 114 referred to in FIG. 1. The network security element 114 is configured to perform the analyzing and selecting techniques, according to an example embodiment. The network security element 115 may be based on a computer system 701 that includes a bus 702 or other communication mechanism for communicating information, and a processor 703 coupled with the bus 702 for processing the information. While the figure shows a single block 703 for a processor, it should be understood that the processors 703 represent a plurality of processing cores, each of which can perform separate processing. The computer system 701 also includes a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703, including instructions for the malware analysis system selection logic 116. In addition, the main memory 704 may be used for storing temporary variables or other intermediate information during the execution of instructions by the processor 703.

The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a liquid crystal display (LCD), for displaying information to a computer user. The computer system 701 may input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710.

The computer system 701 performs a portion or all of the processing steps of the process in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the process, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a wired or wireless network interface card to attach to any packet switched (wired or wireless) LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local area network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.).

In summary, a method is provided that is performed at a network security element associated with a network, the method including: obtaining, at a network security element, a file sent between a first device and a second device, the file having one or more associated attributes; analyzing, at the network security element, the one or more attributes of the file; selecting, based on the analyzing, either a first malware analysis system or a second malware analysis system as a selected malware analysis system for malware analysis of the file; and providing the file to the selected malware analysis system is disclosed. In other words, a method for a security device, such as an NGFW, to dynamically select a most appropriate and cost effective malware analysis system for file analysis is disclosed. Such a method enables an organization to meet confidentiality and legal requirements while simultaneously improving security efficacy and managing costs.

In one aspect, one attribute of the file indicates that the file contains confidential information. The network security element may select a malware analysis system that is in a private domain.

In another embodiment, one attribute of the file indicates that the file is required to stay within a specified geographical area. The network security element selects a malware analysis system that is located within the specified geographical area.

In yet another aspect, the method includes generating, at the network security element, routing information including an entry for the first malware analysis system and an entry for the second malware analysis system, each entry containing at least one attribute for an operating parameter of the first malware analysis system or the second malware analysis system and a value associated with the at least one attribute; and updating the value associated with the at least one attribute based on information received from the first malware analysis system or the second malware analysis system.

In still another embodiment, the malware analysis system is selected based on a remaining capacity, load, and monetary cost of the first malware analysis system and the second malware analysis system.

In another embodiment, the network security element predicts the remaining capacity and the load of the first malware analysis system and the second malware analysis system based on historical usage of the first malware analysis system and the second malware analysis system.

In another aspect of this disclosure, the one or more associated attributes of the file includes one or more of: a confidentiality level of the file; an operating system on which the file is configured to execute; a user of the file; an identity or type associated with the first device; an identity or type associated with the second device; and a geolocation of the file.

In another embodiment, by selecting between the first malware analysis system and the second malware analysis system, the network security element performs a load balancing function.

In yet another embodiment, the first malware analysis system and the second malware analysis system are registered at the network security element. The first malware analysis system is an off-premise malware analysis system and the second malware analysis system is an on-premise malware analysis system.

In another example embodiment, an apparatus is provided that includes a communication interface configured to enable network communications; a processing device coupled with the communication interface, and configured to: obtain a file sent between a first device and a second device, the file having one or more associated attributes; analyze the one or more attributes of the file; select, based on the analyzed one or more attributes of the file, either a first malware analysis system or a second malware analysis system as a selected malware analysis system for malware analysis of the file; and provide the file to the selected malware analysis system.

In another aspect, one or more non-transitory computer readable storage media is provided, encoded with instructions that, when executed by a processor, cause the processor to: obtain a file sent between a first device and a second device, the file having one or more associated attributes; analyze the one or more attributes of the file; select, based on the analyzed one or more attributes of the file, either a first malware analysis system or a second malware analysis system as a selected malware analysis system for malware analysis of the file; and provide the file to the selected malware analysis system.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining, at a network security device, a file sent between a first device and a second device, the file having one or more associated attributes;
analyzing, at the network security device, the one or more attributes of the file to determine whether the file includes confidential information;
based on determining that the file includes the confidential information, selecting, at the network security device, a first malware analysis system as a selected malware analysis system for malware analysis of the file;
based on determining that the file does not include the confidential information, selecting, at the network security device, a second malware analysis system as the selected malware analysis system for the malware analysis of the file;
providing the file to the selected malware analysis system; and
based on results from the selected malware analysis system, providing, at the network security device, the file to the first device or to the second device or blocking the file from being provided to the first device or to the second device.

2. The method of claim 1, wherein, based on one attribute of the file indicating that the file contains the confidential information, selecting the first malware analysis system that is in a private domain, and
wherein the second malware analysis system is in a public domain.

3. The method of claim 1, wherein one attribute of the file indicates that the file is required to stay within a specified geographical area, selecting the first malware analysis system that is located within the specified geographic area and wherein the second malware analysis system is located outside the specified geographical area.

4. The method of claim 1, further comprising:
generating, at the network security device, routing information including a first entry for the first malware analysis system and a second entry for the second malware analysis system, each of the first entry and the second entry containing at least one attribute for an operating parameter of the first malware analysis system or the second malware analysis system and a value associated with the at least one attribute; and
updating the value associated with the at least one attribute based on information received from the first malware analysis system or the second malware analysis system.

5. The method of claim 1, wherein selecting either the first malware analysis system or the second malware analysis system is further based on a remaining capacity, load, and monetary cost of the first malware analysis system and the second malware analysis system.

6. The method of claim 5, further comprising:
predicting the remaining capacity and the load of the first malware analysis system and the second malware analysis system based on historical usage of the first malware analysis system and the second malware analysis system.

7. The method of claim 1, wherein the one or more associated attributes of the file includes one or more of:
a confidentiality level of the file;
an operating system on which the file is configured to execute;
a user of the file;
a first identity or a first type associated with the first device;
a second identity or a second type associated with the second device; and
a geolocation of the file.

8. The method of claim 1, wherein selecting either the first malware analysis system or the second malware analysis system includes performing a load balancing function between the first malware analysis system and the second malware analysis system.

9. The method of claim 1, further comprising:
registering, at the network security device, the first malware analysis system and the second malware analysis system, wherein the first malware analysis system is an off-premise malware analysis system and the second malware analysis system is an on-premise malware analysis system.

10. The method of claim 1, further comprising:
determining, at the network security device, a risk threshold of the file for providing the file to the selected malware analysis system;
receiving, at the network security device, one or more updates about an operating status of the first malware analysis system and the second malware analysis system; and
adjusting, at the network security device, the risk threshold based on the one or more updates.

11. The method of claim 1, further comprising:
analyzing, by the network security device, one or more session attributes of a session established between the first device and the second device,
wherein selecting either the first malware analysis system or the second malware analysis system is based on the one or more file attributes and the one or more session attributes.

12. The method of claim 1, wherein analyzing the one or more attributes includes:
analyzing a confidentiality level attribute of the file to determine whether the file includes the confidential information.

13. An apparatus comprising:
a communication interface configured to enable network communications;
a processor coupled with the communication interface, and configured to:
obtain a file sent between a first device and a second device, the file having one or more associated attributes;
analyze the one or more associated attributes of the file to determine whether the file includes confidential information;
based on determining that the file includes the confidential information, select a first malware analysis system as a selected malware analysis system for a malware analysis of the file;
based on determining that the file does not include the confidential information, select a second malware analysis system as the selected malware analysis system for the malware analysis of the file;

provide the file to the selected malware analysis system; and based on results from the selected malware analysis system, provide the file to the first device or to the second device or block the file from being provided to the first device or to the second device.

14. The apparatus of claim 13, wherein one attribute of the file indicates that the file contains the confidential information, wherein the processor is further configured to:

select the first malware analysis system that is in a private domain, and wherein the second malware analysis system is in a public domain.

15. The apparatus of claim 13, wherein one attribute of the file indicates that the file is required to stay within a specified geographical area, wherein the processor is further configured to:

select the first malware analysis system that is located within the specified geographic area, and wherein the second malware analysis system is located outside the specified geographical area.

16. The apparatus of claim 13, wherein the processor is further configured to:

generate a routing information including a first entry for the first malware analysis system and a second entry for the second malware analysis system, each of the first entry and the second entry containing at least one attribute for an operating parameter of the first malware analysis system or the second malware analysis system and a value associated with the at least one attribute; and update the value associated with the at least one attribute based on information received from the first malware analysis system or the second malware analysis system.

17. The apparatus of claim 13, wherein the processor is configured to select either the first malware analysis system or the second malware analysis system further based on a remaining capacity, load, and monetary cost of the first malware analysis system and the second malware analysis system.

18. One or more non-transitory computer readable storage media encoded with instructions that, when executed by a processor, cause the processor to:

obtain a file sent between a first device and a second device, the file having one or more associated attributes;

analyze the one or more attributes of the file to determine whether the file includes confidential information;

based on determining that the file includes the confidential information, select a first malware analysis system as a selected malware analysis system for a malware analysis of the file;

based on determining that the file does not include the confidential information, select a second malware analysis system as the selected malware analysis system for the malware analysis of the file;

provide the file to the selected malware analysis system; and based on results from the selected malware analysis system, provide the file to the first device or to the second device or block the file from being provided to the first device or to the second device.

19. The computer-readable storage media of claim 18, wherein one attribute of the file indicates that the file contains the confidential information, wherein the instructions further cause the processor to:

select the first malware analysis system that is in a private domain, and wherein the second malware analysis system is in a public domain.

20. The computer-readable storage media of claim 18, wherein one attribute of the file indicates that the file is required to stay within a specified geographical area, wherein the instructions further cause the processor to:

select the first malware analysis system that is located within the specified geographic area, and wherein the second malware analysis system is located outside the specified geographical area.

* * * * *